United States Patent Office 3,476,458
Patented Nov. 4, 1969

3,476,458
STEREOPICTURE REPRODUCTION
Lars Olof Richard Landgren, Skyttevagen 18F,
Saltsjobaden, Sweden
Filed Dec. 11, 1967, Ser. No. 689,511
Claims priority, application Sweden, Dec. 22, 1966,
17,598/66
Int. Cl. G02b 27/24
U.S. Cl. 350—138                                3 Claims

ABSTRACT OF THE DISCLOSURE

A stereopicture reproduction in the form of a book or the like includes two pages facing one another and having a fold line therebetween. A non-reversed stereopicture is disposed on one of these pages and a reversed stereopicture is disposed on the other of these pages, the two pictures being made on the same scale. The distance between the image on the non-reversed picture of an infinitely distant point and said fold line exceeds the distance between the image of the same point on the reversed picture and said fold line by a distance corresponding to the normal interpupillary distance of an adult person, or within the range of about 30 to 70 mm.

---

Figure 1:
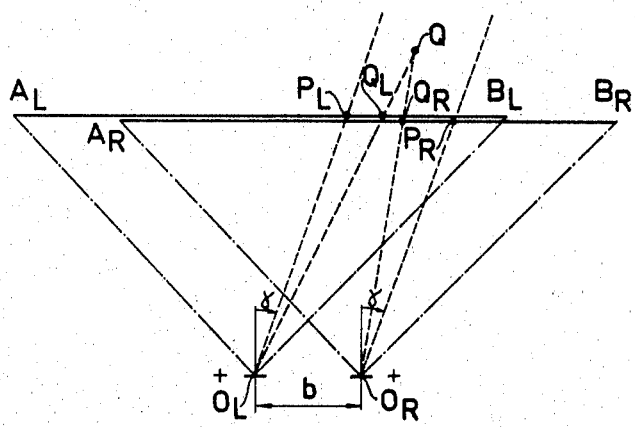

It has been known since long ago that stereoscopic pictures can be reproduced in book-form or similar form through mounting on one of two opposite pages facing each other a first non-reversed component stereopicture and on the other page a reversed second component stereopicture. The two component pictures have been placed symmetrically with respect to the partition line between the two pages, i.e. their folding line. In the present connection the expression "book-form or similar form" should of course be understood to include also pamphlets, advertising folders, etcetera, comprising one or more double pages.

In order to make it possible to obtain the desired stereoscopic impression when viewing the two component pictures, said two opposite pages carrying the pictures are preferably arranged at an obtuse angle, and the reversed component picture is looked at with one eye via a plane mirror arranged in a suitable manner in the bisectrix plane of said angle while the other component picture is viewed directly with the other eye. Through using the mirror the observer will see a virtual non-reversed image of the second component picture lying in the plane of the first component picture. This virtual image of the reversed component picture will, due to the symmetrical arrangement of the two pictures, be superposed on the first component picture in register therewith. However, stereopicture reproductions having the two component pictures arranged in the manner above described have been found to impart to the observer an incorrect impression of the depth as well as of the perspective of an object shown on said pictures. If the two component pictures are arranged in such a manner that the non-reversed virtual image of the reversed component picture will be congruent with the first component picture each infinitely distant object shown on the two component pictures will appear to lie in the plane of the picture, or paper, while all closer objects will seem to be located above the plane of the picture. This means that, for instance, a pictured landscape will give to the observer the unreal impression of a compressed doll-land where the most distant points are lying in the plane of the picture.

The present invention has for its object to provide an improved stereopicture reproduction of the general kind described in the introduction, through which the above mentioned drawbacks of previously known stero reproductions are considerably reduced.

A stereopicture reproduction made in accordance with the invention is primarily characterized in that the two component pictures are arranged in such a manner that the distance between the image on the non-reversed first component picture of an arbitrarily chosen infinitely distant point and the partition line between the two pages carrying the two component pictures, i.e. their folding line, exceeds the distance between the image of said point on the reversed second component picture and said line with a length having an upper limit corresponding to the normal interpupillary distance of an adult person. The picture displacement, i.e. the difference between said two distances, should preferably lie within the interval of 30 to 70 mm., preferably within the interval of 40 to 65 mm.

Another important factor for the attainment of a correct conception of perspective and depth is the picture magnification. According to the invention the product of the linear magnification of a component picture and the focal distance of the camera lens used for taking said picture should be the same for both component pictures and correspond, at least approximately, to normal viewing distance in order to permit a satisfactory conception of perspective and depth.

Figure 2:
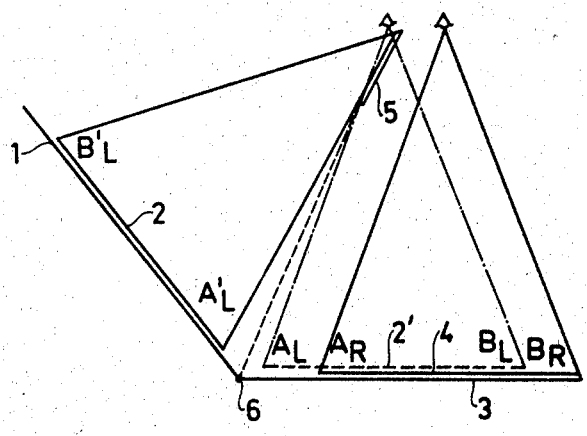
Figure 3:
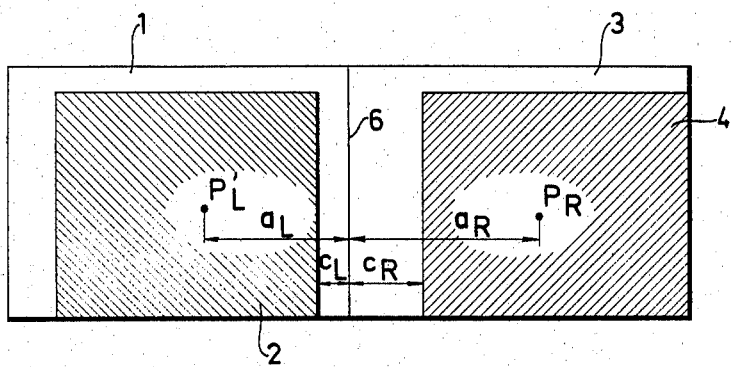
Figure 4:
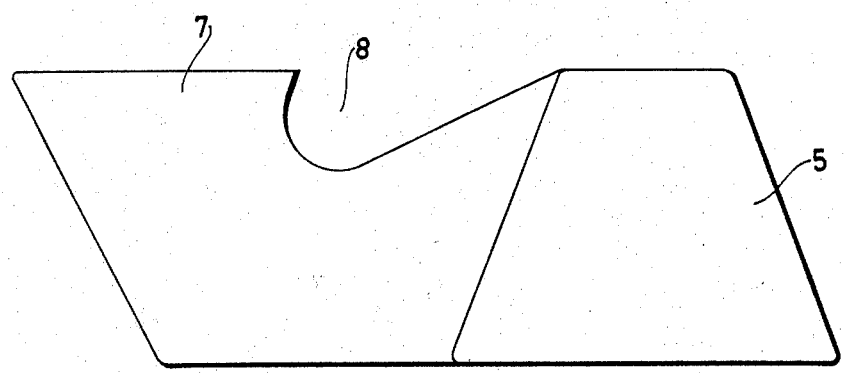

The invention will now be described in greater detail reference being had to the accompanying drawings, in which:

FIGURE 1 schematically illustrates the photographic production of a pair of component stereopictures, FIGURES 2 and 3 show a side elevation and a plan view, respectively, of a stereopicture reproduction made in accordance with the invention, and FIGURE 4 shows a plan view of a suitable mirror device for use in viewing such reproductions.

In FIGURE 1, which schematically illustrates the photographic production of two component stereo pictures, $O_L$ and $O_R$ designate two camera lenses having parallel axes and being spaced apart a distance $b$. In said figure there are shown in dashed lines the optical beams passing, on the one hand, between the two lenses and an infinitely distant point P (not shown) and, on the other hand, between each lens and an adjacent point Q. Said figure further shows two non-reversed component stereopictures $A_LB_L$ and $A_RB_R$ constituting enlargements of the two pictures taken by means of lenses $O_L$ and $O_R$. On these two component pictures which are placed in front of the lenses at a distance therefrom corresponding to the product of the linear magnification of the respective picture and the focal distance of the respective lens and mutually displaced a length corresponding to the interocular distance $b$, the two points P and Q are shown as two pairs of intercorresponding points $P_L$, $P_R$ and $Q_L$, $Q_R$, respectively. The two points $P_L$ and $P_R$ representing the infinitely distant point P on the two component pictures will similar to said pictures themselves be mutually displaced by a length $b$.

When the two component pictuers are arranged in the manner above described points $P_L$ and $P_R$ will, as can be seen from FIGURE 1, fall on the dashed parallel lines between lenses $O_L$ and $O_R$, respectively, and the infinitely distant point P, while points $Q_L$ and $Q_R$ will be lying on the dashed lines between said lenses and point Q. This means that if the two lenses $O_L$ and $O_R$ are replaced by the eyes of a person viewing with his one eye the component picture $A_LB_L$ and with his other eye the component picture $A_RB_R$, this person will obtain a fully correct impression of the depth when viewing the two component pictures. Of course, it is here assumed that the interpupillary distance of the observer is equal to the interocular distance $b$. If the displacement of the two component pictures $A_LB_L$ and $A_RB_R$ is made shorter than the distance $b$, this will cause a false conception of the depth as each point reproduced on the two component pictures will appear to lie closer to the observer than it really does. If there is no displacement at all between the two component pictures as is the case in the known stereopicture reproductions, point P will appear to lie in the plane of the paper while all closer points will be seen as lying between said plane and the observer.

Naturally, in practice it will be necessary to make special arrangements to enable the observer to view only one of the two component pictures with his one eye and only the other component picture with his other eye. When the two component pictures are reproduced in book-form or similar form the simplest way of making it possible to view the two pictures separately as above described is to mount the one component picture reversed on one of two opposite pages and the other component pictures non-reversed on the other one of said two pages. The reversed picture is then viewed via a mirror with the one eye while the non-reversed picture is viewed directly with the other eye.

A stereopicture reproduction made in accordance with the invention is shown in FIGURES 2 and 3. Reference numerals 1 and 3 designate two opposite pages of a book or the like facing each other and of which page 1 carries a reversed component picture 2 and page 3 a non-reversed component picture 4. The reversed component picture 2 is viewed by means of a mirror 5 arranged in the bisectrix plane of the obtuse angle formed between the two pages 1 and 3 (FIGURE 2). Hereby the reversed component picture 2 will be reproduced on page 3 as a virtual non-reversed image 2'. In FIGURE 3 where the two pages 1 and 3 are shown in positions corresponding to a fully opened book or the like, i.e. lying in a common plane, $P_L'$ and $P_R$ designate the two corresponding images of an infinitely distant point P. As will be seen from FIGURE 3, said two points are not arranged symmetrically with respect to the partition line 6 between the two pages 1 and 3. Instead the distance $a_R$ between point $P_R$ on the non-reversed component picture 4 and the partition line 6 is longer than the distance $a_L$ between said line and the corresponding point $P_L'$ on the reversed component picture 2. As mentioned in connection with the description of FIGURE 1, the displacement between the two component pictures, i.e. the difference between distances $a_R$ and $a_L$, must be equal to the interocular distance $b$ to enable an observer to obtain a fully correct impression of the depth. However, also a picture displacement less than the interocular distance $b$ will make it possible for the observer to obtain a more real or true impression of the objects shown on the two component pictures than in case said pictures are arranged symmetrically with respect to the partition line 6 in previously known manner. In FIGURE 3 the distance between partition line 6 and adjacent edges of the two component pictures 2 and 4 have been designated $c_L$ and $c_R$, respectively. Provided that the two pictures are used in uncut state or that they have been uniformly cut the difference between said two distances will be determined by the formula $$c_R - c_L = a_R - a_L = b$$

In order to facilitate a comparison between FIGURES 1 and 2, designations $A_L'B_L'$ referring to the reversed component picture 2, $A_LB_L$ referring to the non-reversed virtual image 2' of said component picture, and $A_RB_R$ referring to the non-reversed component picture 4, have been incorporated in FIGURE 2.

Above it has been explained how the conception of depth is influenced by the picture displacement. However, as already mentioned, the magnitude of the the picture displacement does also have an effect on the perspective conception. As pointed out above, an insufficient picture displacement will result in a compression and deformation of the pictured objects causing a perspective distortion. On the other hand, if the picture displacement is made too large it will become impossible to observe distant objects.

It has already been mentioned and does further appear from FIGURE 1 that the depth and perspective conception is influenced also by the picture magnification. In order to meet the requirement for an acceptable perspective conception the linear magnification of each component picture should be chosen so as to cause each pictured object to extend through a visual angle which as close as possible equals the normal one, i.e. the optic angle sensed by the camera lens. It can be shown that a conform reproduction is obtained if the product of the linear magnification of each picture and the focal distance of the camera lens is equal to the viewing distance. However, as in practice this distance has to vary within certain limits the magnification of a picture should be chosen with regard to what can be considered to be a normal viewing distance, which for reproductions of the kind concerned would be 200 to 400 mm. If the two pictures are not taken by means of the same camera lens it is necessary to make sure that the product of picture magnification and focal distance of the camera lens is equally chosen for both component pictures.

As pointed out above, the picture magnification is of importance also for the depth conception. As a matter of fact, it can be shown that objects reproduced on the pictures will appear expanded and deformed if the product of picture magnification and focal distance of the lens exceeds the viewing distance, whereas they will appear compressed and deformed if said product assumes a value below the viewing distance.

The mirror 5 shown in FIGURE 2 is a plane mirror which can be mounted in known manner on a special support. If the mirror 5 is supported in this way in a fixed position in the bisectrix plane of the obtuse angle formed between the two pages 1 and 3 this will, as a matter of fact, cause certain difficulties to many observers, due to the fact that accommodation and parallax adaptation are combined as a hibitual routine during natural stereovision. However, when viewing two components stereopictures arranged in accordance with the present invention it will be necessary to carry out a considerable parallax adjustment during constant accommodation. For this reason, and due to the fact that some people have an insignificant ordinarily not inconvenient or even conscious disposition to squint, many observers will not be able to obtain any stereoscopic impression of the two combined component pictures. Instead they will only note them as two separate mutually displaced pictures. In addition, a viewing device requiring a special support will scarcely meet reasonable demands for commodity in handling.

It has however, proved possible to eliminate this inconvenience if the mirror can be manually operated, i.e. if the observer can hold the mirror in his hand insead of using a particular support. By way of example, such a manually operated viewing device has been shown in FIGURE 4. The mirror 5, which can have the general shape of a parallel trapezoid, is mounted on a separate carrier plate 7 preferably also formed as a parallel trapezoid and provided with a notch 8 for the thumb of the right hand. It has turned out that an observer can use a mirror mounted in this way with a fairly good result already after a short exercise.

When viewing reproduction of stereopictures arranged in the manner above described the observer should proceed in the following way. The right one of the opposite pages carrying the two component stereopictures should be permitted to rest on a table or the like while the observer with his left hand holds the left page in an obtuse angle with respect to the right page. When doing so the observer can use the table as a support for his left arm. The mirror is then grasped with the right hand and held in such a position that the upper shorter edge thereof will lie some centimetre below the left eye of the observer who can keep his right elbow resting on the table or corresponding support. Through adjusting the inclination of the left page and the inclination of the mirror the observer will easily obtain a distinct stereoscopic impression of the two component pictures. The resulting stereoscopic picture may initially appear slightly distorted. However, depending on the degree of disagreeable impression of the picture the observer will more or less unconsciously adjust the inclination of the mirror until he obtains a correct stereoscopic picture. Provided that the mirror holder has a suitable shape the observer will automatically hold the mirror in such a way that his right hand and arm will not hide the non-reversed component picture on the right page. In this connection it should be mentioned that the use of spectacles has not been found to involve any inconvenience and that the effect of a slight squinting will be eliminated through an unconscious adjustment of the mirror inclination. It should be noted that the viewing device constituted by plate 7 and mirror 5 should be made as light as possible as a heavy viewing device might easily cause the hand holding the mirror to shake. For this reason the mirror itself should be as thin as possible and the plate on which the mirror is mounted should also be made thin and consist of a light stuff. A viewing device of the kind above described will have the further advantage that it can easily be kept in the cover or envelope of a book.

If the mirror is of the conventional type, i.e. made of glass with a reflecting coating on its back surface, it should be made as thin as possible also in order to avoid any interference caused by reflection in the front surface of the mirror.

However, also an ordinary pocket mirror can be used with a fairly decent result, in spite of its weight and thickness and inappropriate shape.

What is claimed is:

1. A stereopicture reproduction in the form of a book or the like comprising at least two pages facing one another and having a fold line therebetween, a non-reversed stereopicture on one of said pages, a reversed stereopicture on the other of said pages, said pictures being made on the same scale, the distance between the image on said non-reversed picture of an infinitely distant point and said fold line exceeding the distance between the image of the same point on said reversed picture and said fold line by a distance within the range of about 30 to 70 mm.

2. A stereopicture reproduction as defined in claim 1 wherein said range preferably comprises about 40 to 65 mm.

3. A stereopicture reproduction as defined in claim 1 wherein each of said pictures is characterized in that the product of the linear magnification of the picture and the focal distance of the camera lens used for taking the picture is approximately equal to the normal viewing distance.

References Cited

UNITED STATES PATENTS

| | | | |
|---|---|---|---|
| 1,105,395 | 7/1914 | Balmitgere | 350—137 |
| 2,704,960 | 3/1955 | Loud | 350—137 |
| 2,842,027 | 7/1958 | Betti | 350—138 |
| 2,972,284 | 2/1961 | Forman | 350—138 |

FOREIGN PATENTS

| | | |
|---|---|---|
| 678,342 | 7/1939 | Germany. |
| 505,602 | 5/1939 | Great Britain. |

DAVID SCHONBERG, Primary Examiner

P. R. GILLIAM, Assistant Examiner

U.S. Cl. X.R.

350—132, 140